US007874398B2

(12) United States Patent
Mikels et al.

(10) Patent No.: US 7,874,398 B2
(45) Date of Patent: Jan. 25, 2011

(54) REARWARD TORQUE ARM FOR DAMPING INDEPENDENTLY SUSPENDED AND DRIVEN AXLE SHAFTS

(75) Inventors: David W. Mikels, Northville, MI (US); David M. Caldwell, Roseville, MI (US); Young-Jin Seo, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 228 days.

(21) Appl. No.: 12/147,561

(22) Filed: Jun. 27, 2008

(65) Prior Publication Data
US 2009/0160152 A1 Jun. 25, 2009

Related U.S. Application Data

(60) Provisional application No. 61/014,783, filed on Dec. 19, 2007.

(51) Int. Cl.
*B60K 17/04* (2006.01)
(52) U.S. Cl. ............ 180/358; 280/124.11; 280/124.156
(58) Field of Classification Search .......... 280/124.137, 280/124.156, 124.104, 124.105, 124.109, 280/124.11, 124.116; 180/311, 312, 353, 180/374, 380, 358, 359, 360
See application file for complete search history.

(56) References Cited

U.S. PATENT DOCUMENTS

| 1,789,242 | A |   | 1/1931 | Marsh |            |
|-----------|---|---|--------|-------|------------|
| 3,170,534 | A | * | 2/1965 | Kelley et al. | 180/308 |
| 3,379,268 | A | * | 4/1968 | Enke  | 180/360    |
| 4,153,131 | A |   | 5/1979 | Sakata et al. |     |
| 4,240,517 | A |   | 12/1980 | Harlow, Jr. et al. |    |
| 4,334,696 | A | * | 6/1982 | Bergstrom | 280/124.104 |
| 4,413,701 | A | * | 11/1983 | Kumagai | 180/256 |
| 4,432,428 | A | * | 2/1984 | Kondo et al. | 180/360 |
| 4,436,175 | A |   | 3/1984 | Watanabe et al. |    |
| 4,483,408 | A | * | 11/1984 | Yazaki | 180/361 |
| 4,560,027 | A | * | 12/1985 | Murakami et al. | 180/312 |
| 4,771,842 | A |   | 9/1988 | Mishio et al. |     |
| 4,819,756 | A | * | 4/1989 | Krude | 180/360 |
| 5,161,638 | A | * | 11/1992 | Hirano | 180/360 |
| 5,188,194 | A |   | 2/1993 | Gasch |            |
| 6,085,858 | A | * | 7/2000 | Wakana et al. | 180/300 |
| 6,209,676 | B1 | * | 4/2001 | Jones et al. | 180/354 |
| 6,398,686 | B1 |   | 6/2002 | Irwin |            |
| 6,439,588 | B1 | * | 8/2002 | Svensson | 280/124.116 |

(Continued)

OTHER PUBLICATIONS

Press Release of 2009 Cadillac CTS-V by General Motors Corporation, Detroit, MI (dated Jan. 14, 2008, first released on Jan. 8, 2008).

(Continued)

*Primary Examiner*—Paul N Dickson
*Assistant Examiner*—Karen A Beck

(57) ABSTRACT

An independently suspended, driven axle shaft set in which the axle shafts are driven by a differential which is rigidly connected to the body of the motor vehicle by a rearward torque arm, whereby powerhop is mitigated thereby. Where the axle shafts are torsionally asymmetric with respect to each other, the differential is a limited slip differential and the relative torsional stiffness therebetween is different by a ratio substantially between about 1.4 to 1 and about 2.0 to 1, wherein powerhop is mitigated synergistically by both the rearward torque arm and the asymmetric axle shafts.

19 Claims, 10 Drawing Sheets

U.S. PATENT DOCUMENTS

| | | | |
|---|---|---|---|
| 6,729,455 B2 | 5/2004 | Hirota et al. | |
| 7,111,705 B2 * | 9/2006 | Ohta et al. | 180/312 |
| 7,264,079 B2 * | 9/2007 | Bordini | 180/253 |
| 7,588,117 B2 * | 9/2009 | Fukuda | 180/291 |
| 7,628,457 B2 * | 12/2009 | Pochatila et al. | 301/132 |
| 2002/0128117 A1 * | 9/2002 | Schroder et al. | 477/72 |
| 2005/0045411 A1 * | 3/2005 | Knapke et al. | 180/337 |
| 2006/0017256 A1 * | 1/2006 | Hupperich, Jr. | 280/124.156 |
| 2006/0027992 A1 * | 2/2006 | Bordini | 280/124.156 |
| 2007/0114080 A1 | 5/2007 | Kaiser et al. | |
| 2009/0159359 A1 | 6/2009 | Mikels et al. | |
| 2009/0178875 A1 * | 7/2009 | Bowers | 180/359 |
| 2009/0194963 A1 * | 8/2009 | Tomlin et al. | 280/124.116 |
| 2009/0229908 A1 * | 9/2009 | Ito | 180/312 |

OTHER PUBLICATIONS

Press Release of 2009 Corvette ZR1 by General Motors Corporation, Detroit, MI (dated Dec. 20, 2007).

"Stability Analysis of Solid Axle, Torque Arm Suspension Vehicles under Heavy Acceleration and Braking Events" by Young-Jin Seo, Kenneth L. Oblizajek and Steven P. Fuja, presented at the SAE 2008 World Congress, Detroit, MI (presented on Apr. 15, 2008, submitted to SAE for approval on Dec. 26, 2007).

* cited by examiner

REARWARD TORQUE ARM FOR DAMPING INDEPENDENTLY SUSPENDED AND DRIVEN AXLE SHAFTS

CROSS-REFERENCE TO RELATED APPLICATIONS

The present patent application claims the benefit of provisional patent application Ser. No. 61/014,783, filed on Dec. 19, 2007, which provisional patent application is presently pending, the entire disclosure of which is hereby herein incorporated by reference.

TECHNICAL FIELD

The present invention relates generally to driven axle shafts of motor vehicles. More particularly, the present invention relates to an axle shaft set in which the axle shafts are driven via a rear differential module, wherein mitigation of power-hop is provided by a torque arm spanning rearwardly between the rear differential module and the vehicle body.

BACKGROUND OF THE INVENTION

Motor vehicles with driven axle independent suspensions include a pair of axle shafts (also referred to as split axles or half shafts), one for each wheel, as described, merely by way of exemplification, in U.S. Pat. No. 4,699,235 issued on Oct. 13, 1987 to Anderson and assigned to the assignee of the present patent application, the disclosure of which is hereby incorporated herein by reference.

Referring now to FIG. 1A, the split axle drive system of U.S. Pat. No. 4,699,235 will be briefly described for point of reference, it being understood the present invention may apply to two wheel drive or four wheel drive systems.

Shown is a schematic plan view of a part-time four-wheel drive vehicle, comprising an internal combustion engine 10, transmission 12 and transfer case 14 mounted on a vehicle chassis (not shown). The engine 10 and transmission 12 are well-known components as is the transfer case 14 which typically has an input shaft (not shown), a main output shaft 16 and an auxiliary output shaft 18. The main output shaft 16 is drive connected to the input shaft in the transfer case 14 and is customarily aligned with it. The auxiliary output shaft 18 is drive connectable to the input shaft by a clutch or the like in the transfer case 14 and customarily offset from it. The transfer case clutch is actuated by a suitable selector mechanism (not shown) which is generally remotely controlled by the vehicle driver.

The main output shaft 16 is drivingly connected to a rear propeller shaft 20 which in turn is drivingly connected to a rear differential 22. The rear differential 22 drives the rear wheels 24 through split axle parts in a well-known manner. The auxiliary output shaft 18 is drivingly connected to a front propeller shaft 26 which in turn is drivingly connected to a split axle drive mechanism 28 for selectively driving the front wheels 30 through split axle parts. The split axle drive mechanism 28 is attached to the vehicle chassis by means including a bracket 34 on an extension tube 32.

Suitable split axle parts, commonly referred to as half shafts, are well-known from front wheel drive automobiles. These may be used for connecting the split axle drive mechanism 28 to the front wheels 30. The drawings schematically illustrate a common type of half shaft for driving connection to independently suspended steerable vehicle wheels comprising an axle shaft 40 having a plunging universal joint 42 at its inboard end adapted for connection to an output such as the flange 36 or 38 and the well-known Rzeppa-type universal joint 44 at its outboard end adapted to be connected to the vehicle wheel 30.

FIG. 1B depicts an example of a prior art motor vehicle rear suspension 52 of a motor vehicle drive system which incorporates a pair of axle shafts 50. The axle shafts 50 are in the form of a set of two symmetric axle shafts: a first axle shaft 50a and a second axle shaft 50b. The rear suspension 52 includes a cradle 54 which is attached, in this application, by resilient cradle mounts 56 to a frame (not shown) of the motor vehicle. A rear differential module 58 is connected to the cradle 54 via resilient rear differential module mounts 60, and is further connected, via constant velocity joints 62a, 62b to the first and second axles shafts 50a, 50b, respectively, of the axle shafts 50. The first and second axle shafts 50a, 50b are independently suspended via the constant velocity joints 62a, 62b so they are able to independently articulate along arrows 64a, 64b. A propeller shaft 66 is connected at one end to a transmission (not shown) and at its other end, via a constant velocity (or other type of) joint 68, to the rear differential module 58.

Problematically, axle shafts frequently exhibit "powerhop" when a large amount of torque is applied thereto. Powerhop typically occurs when tire friction with respect to a road surface is periodically exceeded by low frequency (i.e., below about 20 Hz) oscillations in torsional windup of the axle shafts. Powerhop produces oscillatory feedback to suspension and driveline components and can be felt by the vehicle occupants, who may describe the sensation as "bucking," "banging," "kicking" or "hopping."

Axle shafts are typically manufactured from steel bar material and, as such, act as very efficient torsional springs. In the interest of reducing unwanted oscillations in the axle shafts, the standard practice has been to adjust the size (i.e., increasing the diameter) of the axle shafts in such a way to minimize the negative impact of oscillations by increasing the overall torsional stiffness of the axle shafts, thereby reducing powerhop. However, increasing the diameter of the axle shafts results in additional packaging, mass and cost related problems, while not really addressing the core issue of directly damping oscillations that are associated with powerhop, to wit: lack of damping to absorb energy placed into the driveline by the negative damping characteristics of the tires during hard longitudinal acceleration or deceleration.

FIG. 1C is a graph 70 of axle shaft torque versus time for conventional symmetric axle shafts, wherein plots 72, 74 are respectively for each axle shaft, and wherein each axle shaft has a torsional stiffness of 525 Nm/deg. (i.e., Newton meters per degree). It will be seen that torque oscillations are in phase, whereby the conditions for powerhop are not mitigated in that the torque oscillations of each axle shaft are constructive with respect to each other.

Referring now to FIG. 1D, shown is a prior art solid axle rear drive system 78 which attempts to mitigate powerhop, wherein a forward torque arm 80 spans between the transmission 82 and the rear differential module 84. A pair of solid axle shafts 86a, 86b are operatively connected, without independent articulation, to the rear differential module 84. A track bar 87, a stabilizer 88, and a lower control arm 89 are further included.

While a forward torque arm may reduce powerhop in solid axle applications, as in FIG. 1D, it is not suitable for independently suspended axle shafts as in FIGS. 1A and 1B. This is demonstrated at FIGS. 1E and 1F. FIG. 1E is a graph 90 of axle shaft torque versus time for a symmetric axle shaft set, each axle shaft having a torsional stiffness of 525 Nm/deg., and the propeller shaft torsional stiffness is 138 Nm/deg. Plot 92 shows lack of damping, in fact the plot shows an increasing amplitude of the torque oscillations with increasing time. FIG. 1E is a graph 94 plotting vertical tire force, Plot 96, and plotting tire angular slip velocity, plot 98, both versus time for the drive system of FIG. 1E. It will be seen that Plots 96 and 98 are out of phase, wherein vertical tire force is increasing as tire angular slip velocity is decreasing. Therefore, because a forward torque arm provides a negative coupling as powerhop decays, it is unable to mitigate powerhop for independently suspended, driven axle shafts; indeed, the negative coupling may actually promote powerhop oscillations. In this regard, by "negative coupling" is meant vertical tire force and wheel angular velocity are out of phase, even opposite phase; whereas by "positive coupling" is meant vertical tire force and wheel angular velocity have similar phase. Therefore, a forward torque arm is not suitable for mitigating powerhop for independently suspended, driven axle shafts.

Accordingly, there is a clearly felt need for damping of independently suspended axle shafts so as to thereby provide reduction of powerhop and associated driveline disturbances, such as for example axle shutter.

SUMMARY OF THE INVENTION

The present invention is an independently suspended, driven axle shaft set interfaced with a rearward torque arm, whereby provided is mitigation of powerhop and associated driveline disturbances, such as for example axle shutter.

According to the present invention, in an independently suspended, driven axle shaft set, a rigid rearward torque arm is rigidly connected at one end thereof to a differential which is drivingly connected to the axle shaft set, and to the motor vehicle body at the other end thereof at a fixed spacing therefrom. The rearward torque arm provides a positive coupling of the vibrations as between the two axle shafts, wherein a non-linear coupling of vertical and torsional motions directly to the motor vehicle body results in decay of powerhop oscillations. The axle shafts may be symmetric or asymmetric in terms of torsional stiffness with respect to each other.

In the case of use of the rearward torque arm with asymmetric axle shafts, the axle shafts are asymmetrically tuned such that the relative torsional stiffness therebetween is different by a ratio substantially between about 1.4 to 1 and about 2.0 to 1. The asymmetry may be provided by any known modality that alters torsional stiffness and is compliant with operational load demands of the axle shafts, as for example the axle shafts having the same length, but differing cross-sectional diameters; by the axle shafts having the same cross-sectional diameters, but differing lengths; by the axle shafts having differing solidity (i.e., being solid versus hollow); by the axles shafts having differing material composition; or a combination thereof. The asymmetric axle shafts are operably connected to a limited slip differential in order to provide an axle-to-axle friction torque coupling through which out of phase torque oscillation damping between the asymmetric axle shafts occurs. For example, the asymmetric axle shafts are suspended in a cradle which is, itself, connected to the vehicle frame or body either directly or via a plurality of resilient cradle mounts having a stiffness which is tuned, per a particular application, to maximize the mitigation of powerhop in conjunction with the asymmetry of the axle shafts.

An aspect of the present invention is, therefore, the simultaneous implementation of asymmetric axle shafts in combination with a rearward torque arm, whereby powerhop is optimally mitigated thereby over a wide range of road conditions, including wet and dry pavements.

Accordingly, it is an object of the present invention to provide, in an independently suspended, driven axle shaft set, a rearward torque arm connected between a differential and the motor vehicle frame (or body), and optionally to combine therewith torsional stiffness asymmetry of the axle shafts with respect to each other, wherein the rearward torque arm, with or without the optional axle shafts asymmetry, provides mitigation of powerhop and associated driveline disturbances, such as for example axle shutter.

This and additional objects, features and benefits of the present invention will become clearer from the following specification of a preferred embodiment.

DESCRIPTION OF THE PREFERRED EMBODIMENT

Figure 1A:
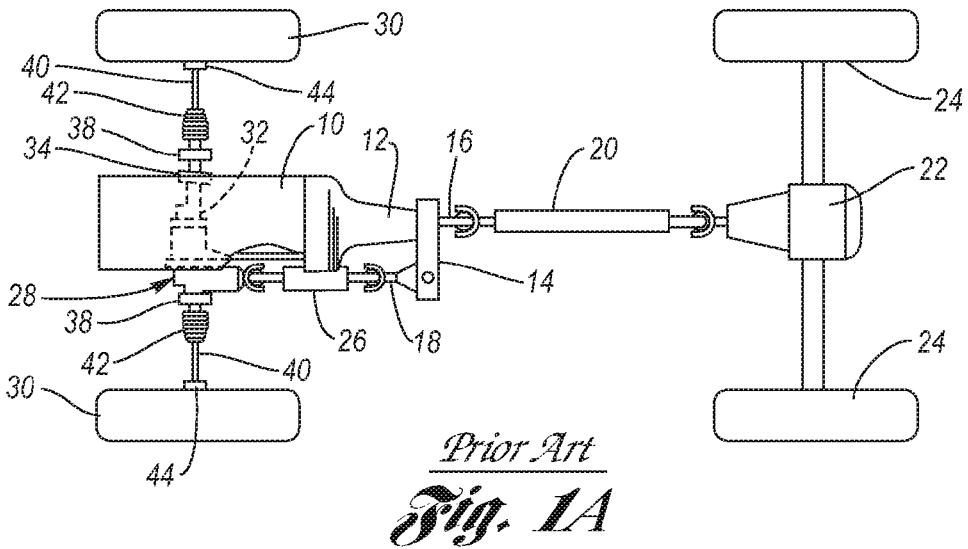
FIG. 1A is a schematic plan view of a part-time four-wheel drive vehicle according to the prior art.

Referring now to the Drawing, FIGS. 2 through 16 depict various aspects of a motor vehicle drive system having independently suspended, driven axle shafts drivingly connected to a differential, wherein a rearward torque arm rigidly connects between the differential and the body of the motor vehicle.

Figure 1B:
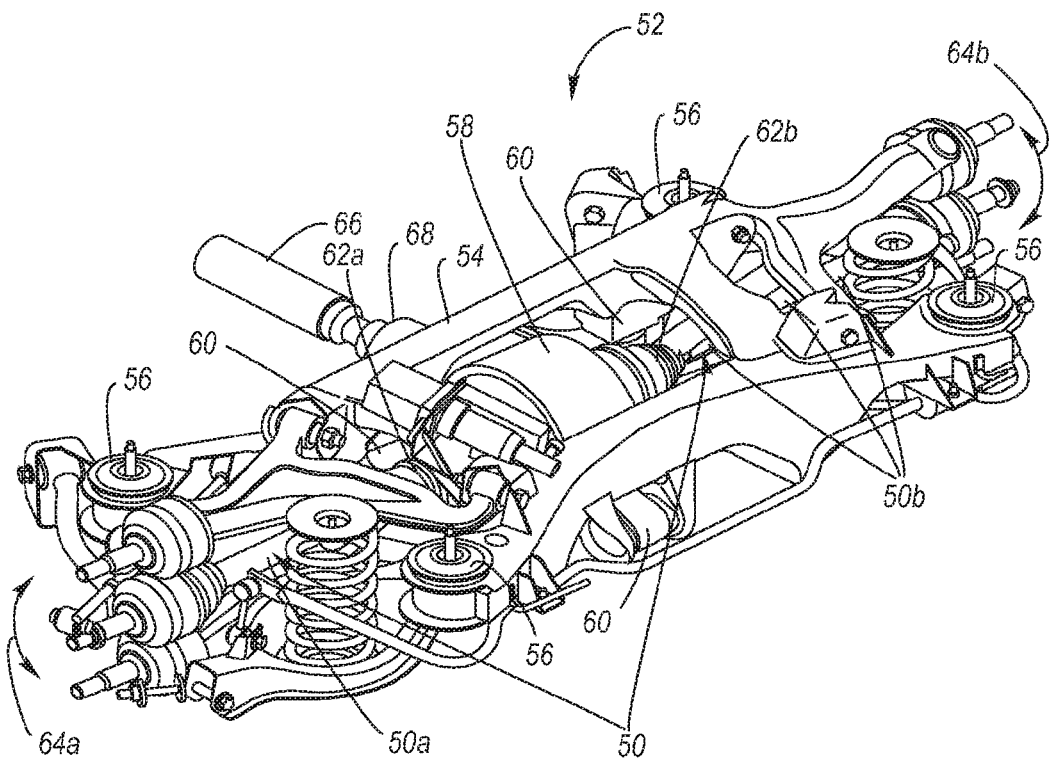
FIG. 1B is a representation of a prior art rear suspension of a vehicle employing symmetric, independently suspended, driven axle shafts.
Figure 2A:
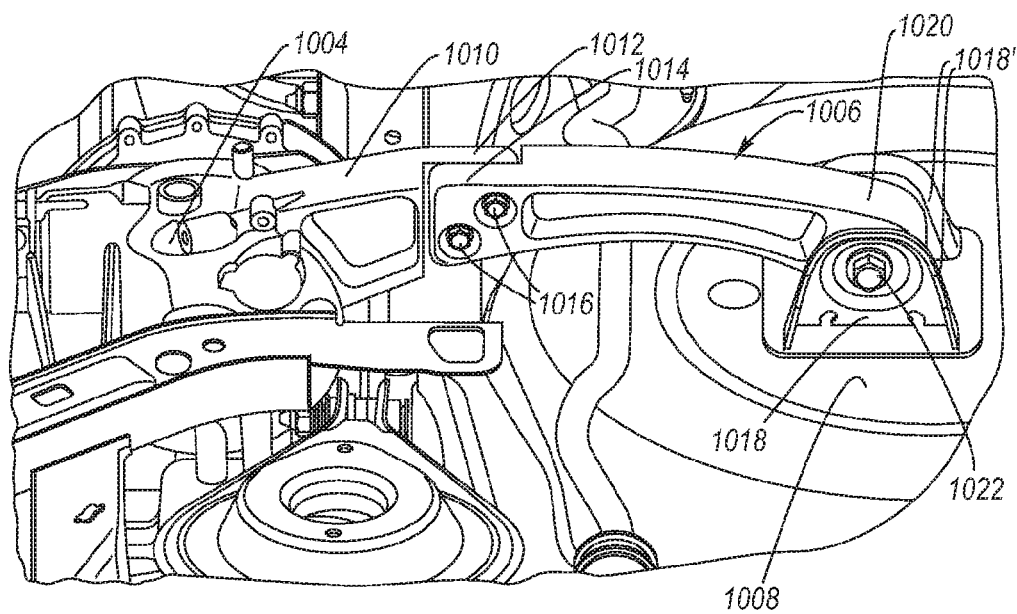
FIG. 2A is an inverted side perspective view of a rear differential module of an independently suspended, driven axle shaft set, showing in particular a rearward torque arm according to the present invention.
Figure 2B:
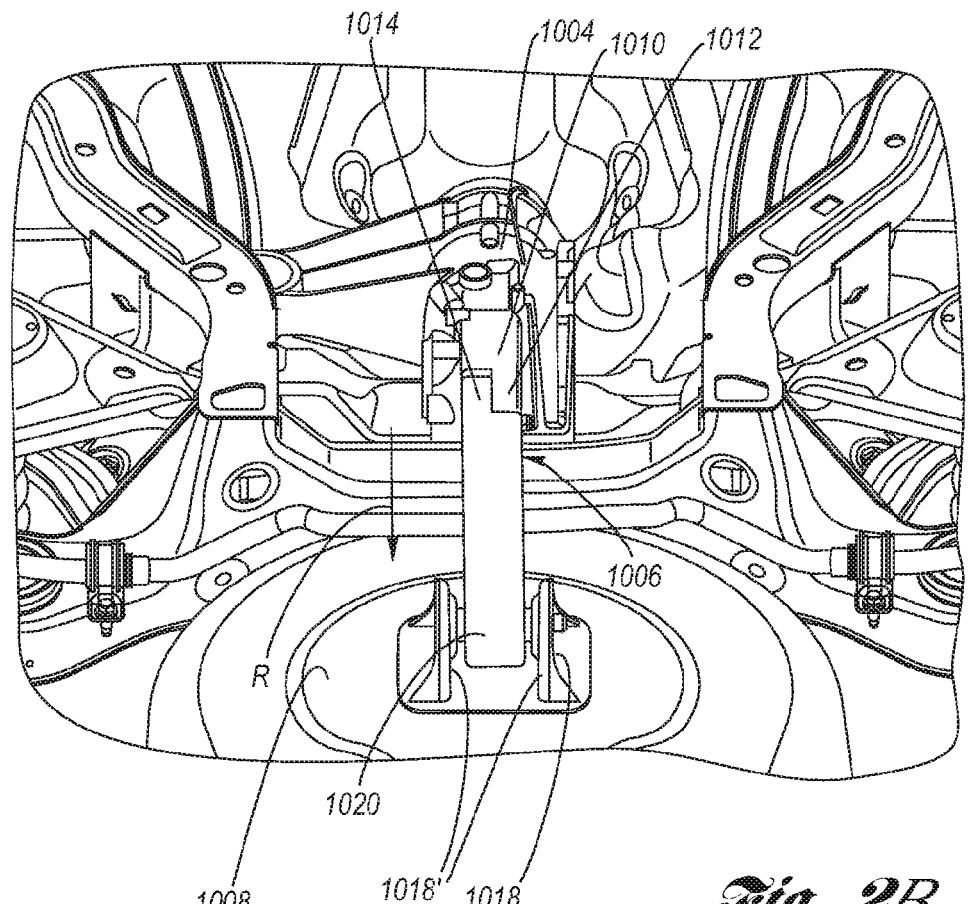
FIG. 2B is a bottom side perspective view of the rear differential module of an independently suspended, driven axle shaft set and rearward torque arm according to the present invention as in FIG. 2A.
Figure 5:
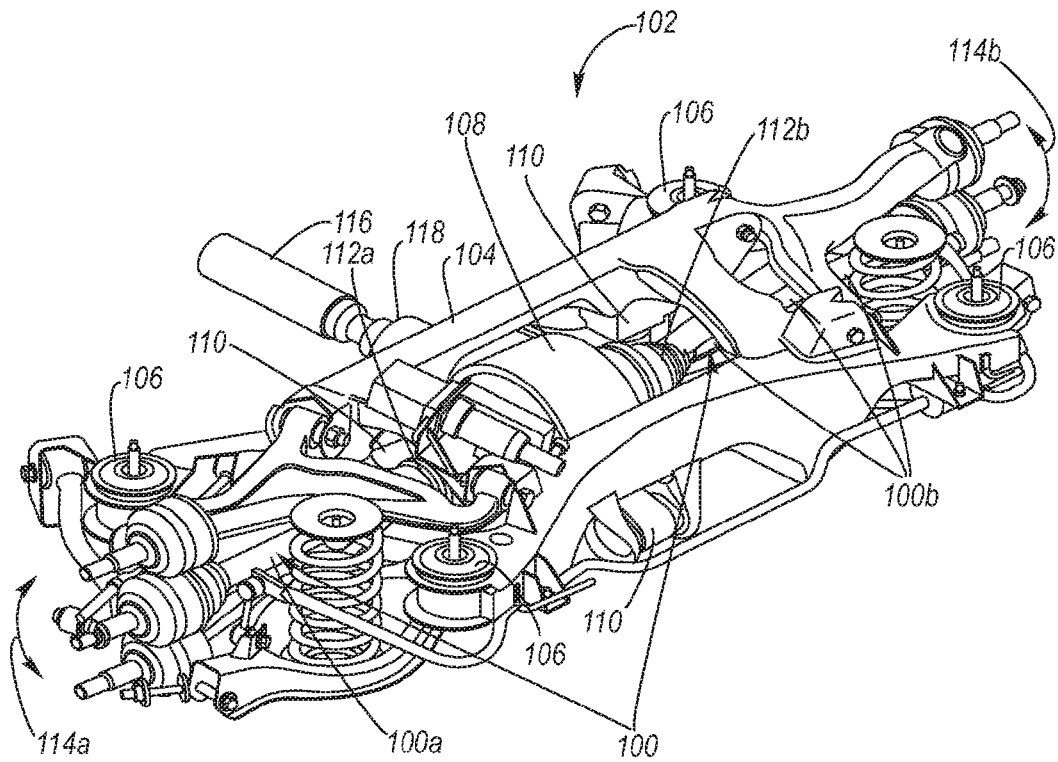
FIG. 5 is a representation of a rear suspension of a vehicle employing asymmetric axle shafts according to the present invention.

Referring firstly to FIGS. 2A and 2B, a motor vehicle drive system 1000 has independently suspended, driven axle shafts (see for example 50 in FIG. 1B and 100 in FIG. 5) drivingly connected to a rear differential module 1004, which is, in turn, driven by a propeller shaft (as for example 66 in FIG. 1B and 116 in FIG. 5). A rigid rearward torque arm 1006 connects between the rear differential module 1004 and the body (i.e., any suitably rigid structural member) 1008 of the motor vehicle.

An example of an implementation of the present invention can be understood by way of comparison between FIGS. 1B and 5 with FIGS. 2A and 2B. The rear differential module 58 of FIG. 1B or 108 of FIG. 5 is modified into the differential module 1004 of FIGS. 2A and 2B by a torque arm bracket 1010 being connected thereto, as for example by suitable interfacing with rigid affixment as for example by bolting or welding, wherein the torque arm bracket has a rearwardly directed (i.e., towards the rear of the motor vehicle) torque arm seat 1012. A forward end 1014 of the rearward torque arm 1006 is connected to the torque arm seat 1012 such that the rearward torque arm 1006 is rigid with respect to the rear differential module 1004 and cannot articulate with respect thereto, as for example via a pair of mutually off-set bolts 1016.

In rearward relation to the rear differential module 1004 (see arrow R in FIG. 2B, wherein by "rearward" is meant, given the body of the motor vehicle has a front end and a rear end, closer to the rear end of the body), a torque arm connector 1018 is affixed to the body 1008 of the motor vehicle, as for example at the trunk floor. An example of a torque arm connector 1018 is a clevis 1018' which receives a rearward end 1020 of the rearward torque arm 1006 is received by the clevis 1018' and attached thereto, as for example by a passing through bolt 1022. The clevis 1018' connects the rearward end 1020 of the rearward torque arm 1004 at a fixed spatial distance from the body at the connection, although the bolt 1022 allows for articulation, as for example in response to action of the cradle mounts, if present. By way merely of referential exemplification and not limitation, the rearward torque arm may be between about 30 cm and 60 cm long.

In operation, with respect to a motor vehicle drive system having independently suspended axle shafts driven by a differential module, a rearward torque arm (i.e., rearward in the sense it connects to the body rearward of the differential module) provides torque oscillation damping by virtue of the rearward torque arm providing positive coupling of the vibrations as between the two axle shafts, wherein a non-linear coupling of vertical and torsional motions directly to the motor vehicle body results in decay of powerhop oscillations, and wherein the axle shafts may be symmetric or asymmetric in terms of torsional stiffness with respect to each other.

Figure 3:
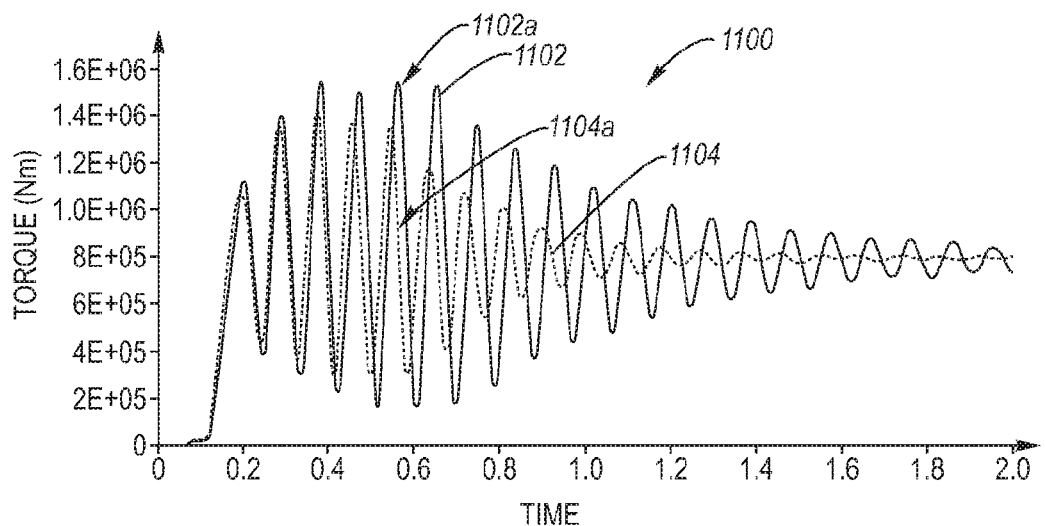
FIG. 3 is a graph of torque versus time of a symmetric axle shaft set and rear differential module with and without a rearward torque arm according to the present invention.
Figure 4A:
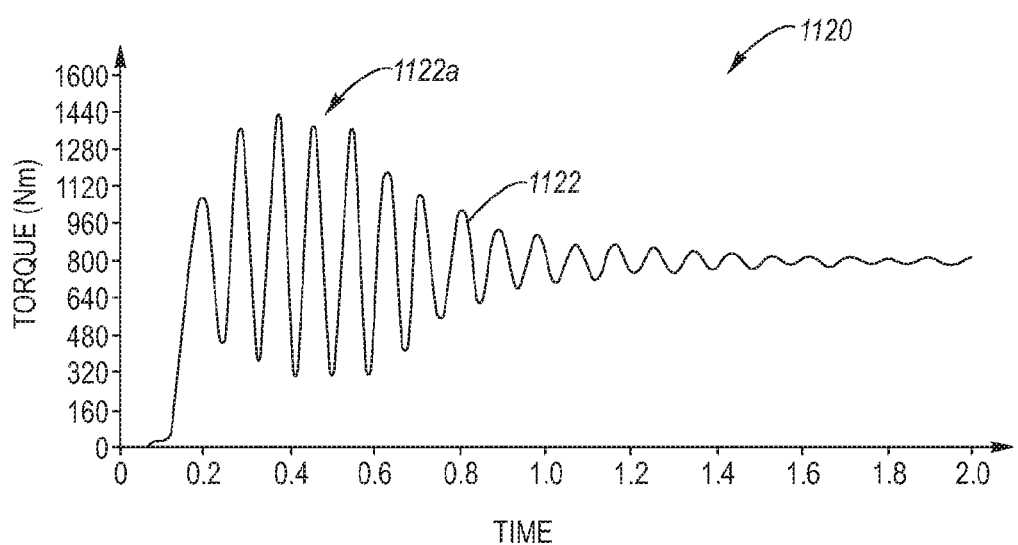
FIG. 4A is a graph of total torque versus time of a symmetric axle shaft set and rear differential module with a rearward torque arm according to the present invention.
Figure 4B:
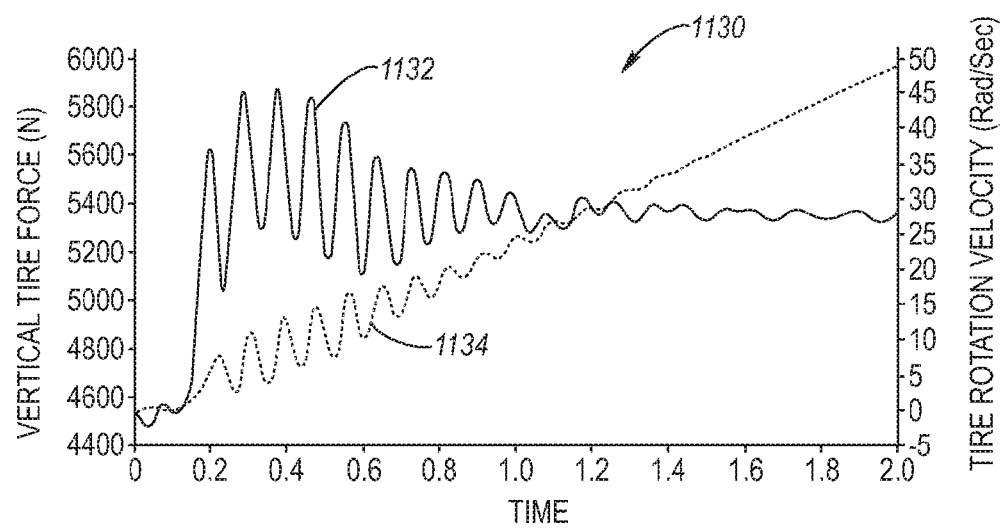
FIG. 4B is a graph of vertical tire force versus time of a symmetric axle shaft set and rear differential module with a rearward torque arm according to the present invention, showing in phase vertical loading increasing as tire angular velocity is increasing.

The powerhop mitigation quality of the rearward torque arm according to the present invention with respect to independently suspended, driven axle shafts is demonstrated at FIGS. 3 through 4B.

FIG. 3 is a graph 1100 of propeller shaft torque versus time for conventional symmetric axle shafts, each axle shaft having a torsional stiffness of 525 Nm/deg., wherein at Plot 1102 the rearward torque arm is not present, and at Plot 1104 the rearward toque arm according to the present invention is present. It will be seen that torque oscillations have less amplitude in the first plot portion 1104a of Plot 1104, than the first plot portion 1102a of Plot 1102. As such, with the rearward torque arm being present, powerhop which may be felt by the motor vehicle occupants at first plot portion 1102a may not felt at first plot portion 1104a. The remainder of Plots 1102 and 1104 indicate that in both cases the torque oscillation amplitudes are too small to be felt, but even there it is seen the torque oscillations damp faster when the torque arm is present.

Figure 1C:
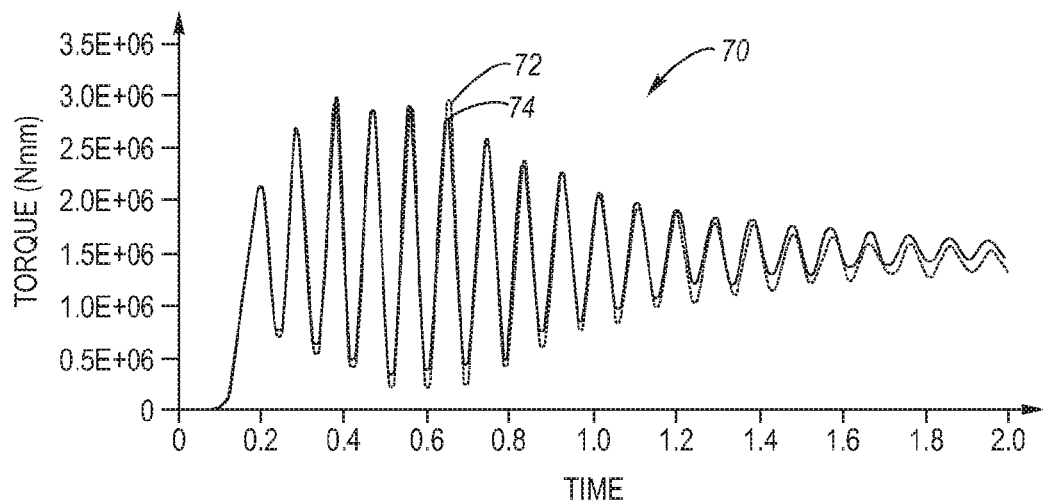
FIG. 1C is a graph of torque versus time of a symmetric axle shaft set according to the prior art.
Figure 1D:
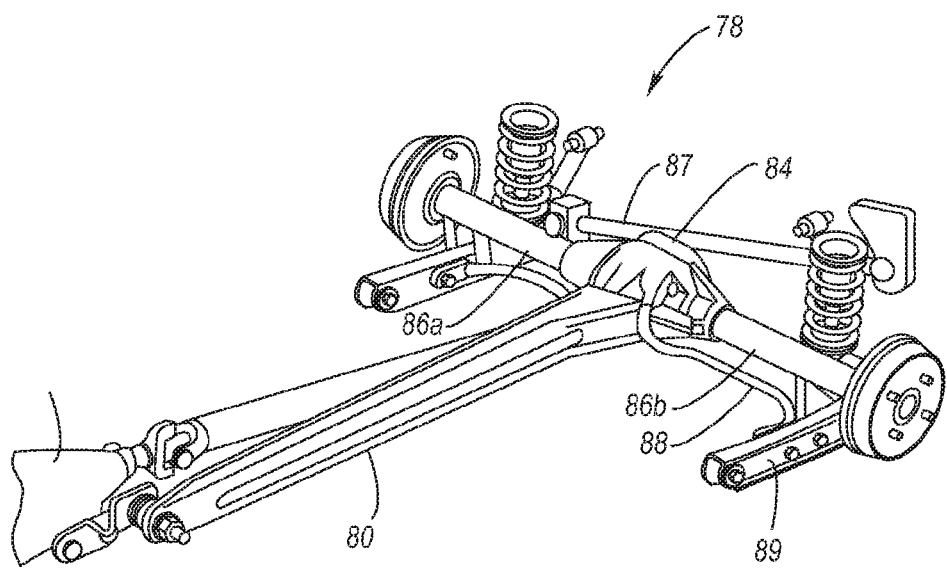
FIG. 1D is a representation of a prior art rear suspension of a vehicle employing a solid rear axle, wherein there is no independent articulation, a forward torque arm of the prior art being shown in operation therewith.
Figure 1E:
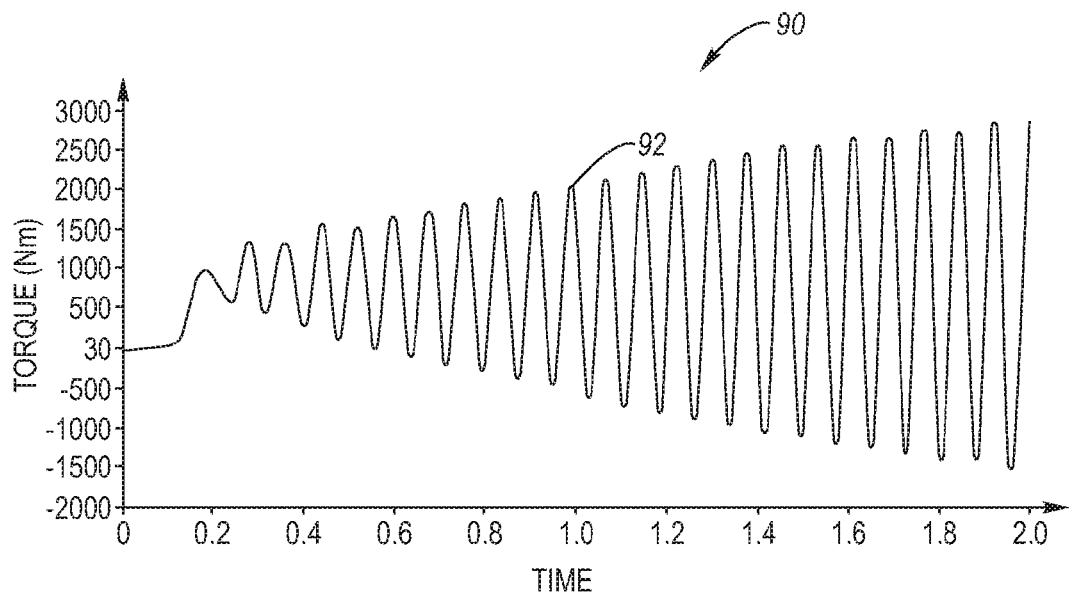
FIG. 1E is a graph of total torque versus time of a symmetric axle shaft set and rear differential module with a forward torque arm.
Figure 1F:
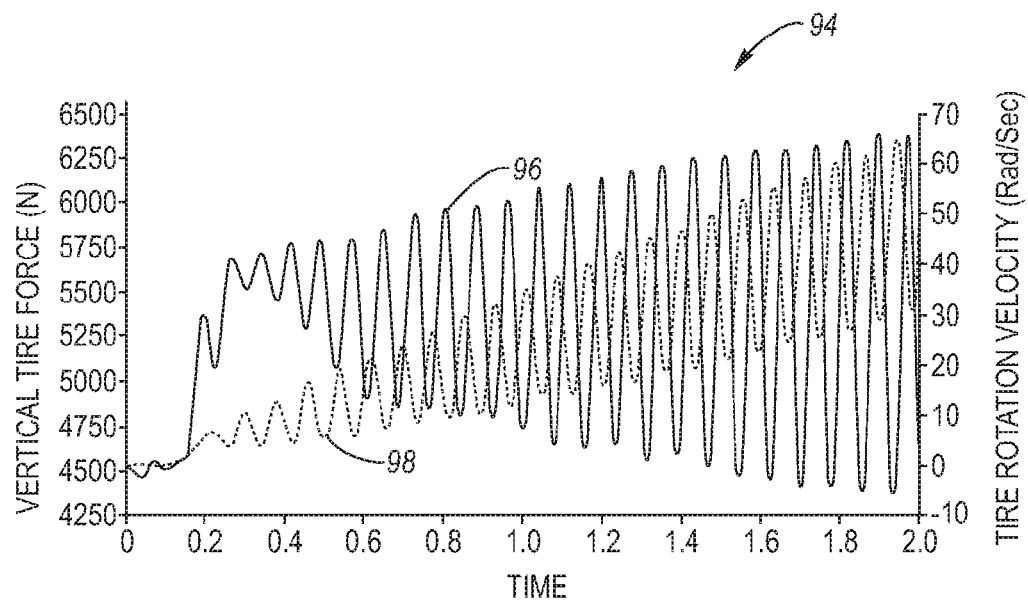
FIG. 1F is a graph of vertical tire force versus time of the symmetric axle shaft set and rear differential module with a forward torque arm as in FIG. 1E, showing out of phase vertical loading increasing as tire angular slip velocity is decreasing.

Turning attention next to FIGS. 4A and 4B, FIG. 4A is a graph 1120 of axle shaft torque versus time for a symmetric axle shaft set, wherein each axle shaft has a torsional stiffness of 525 Nm/deg., and the propeller shaft torsional stiffness is 138 Nm/deg. Plot 1122 shows damping, wherein the plot shows an first plot portion 1122a in which torque oscillation amplitude is well behaved, then for the remainder of the plot rapidly decreases. FIG. 4B is a graph 1130 plotting vertical tire force, Plot 1132, and plotting tire angular slip velocity, Plot 1134, both versus time for the drive system of FIG. 4A. It will be seen that Plots 1132 and 1134 are in phase, wherein vertical tire force is increasing as tire angular slip velocity is increasing. Therefore, because a rearward torque arm provides a positive coupling as powerhop decays, it is able to mitigate powerhop for independently suspended, driven axle shafts. It is interesting to compare FIGS. 1F and 1E with FIGS. 4A and 4B to appreciate the benefit of the rearward torque arm according to the present invention.

As mentioned, the rearward torque arm may be used with independently suspended, drive axle shafts which are torsionally symmetric or asymmetric, as described in provisional patent application 61/014,783, which disclosure will now be revisited at FIGS. 5 through 14, whereupon thereafter, at FIGS. 15 and 16, the rearward torque arm according to the present invention will be discussed when used with asymmetric axle shafts.

FIG. 5 depicts an example of a motor vehicle rear suspension 102 of a motor vehicle drive system which incorporates the asymmetric axle shafts 100. The asymmetric axle shafts 100 are in the form of a set of two mutually asymmetric axle shafts: a first axle shaft 100*a* and a second axle shaft 100*b*, wherein the asymmetry therebetween is such that each has a different torsional stiffness with respect to the other. The rear suspension 102 includes a cradle 104 which is attached, in this application, by resilient cradle mounts 106 to a frame (not shown) of the motor vehicle. A rear differential module 108 is connected to the cradle 104 via resilient rear differential module mounts 110, and is further connected, via constant velocity joints 112*a*, 112*b* to the first and second axles shafts 100*a*, 100*b*, respectively, of the asymmetric axle shafts 100. The first and second axle shafts 100*a*, 100*b* are independently suspended via the constant velocity joints 112*a*, 112*b* so they are able to independently articulate along arrows 114*a*, 114*b*. A propeller shaft 116 is connected at one end to a transmission (not shown) and at its other end, via a constant velocity (or other type of) joint 118, to the rear differential module.

Referring in addition to FIGS. 6 through 14, structural and functional aspects of the asymmetric axles shafts 100, 100' will be detailed.

Figure 6:
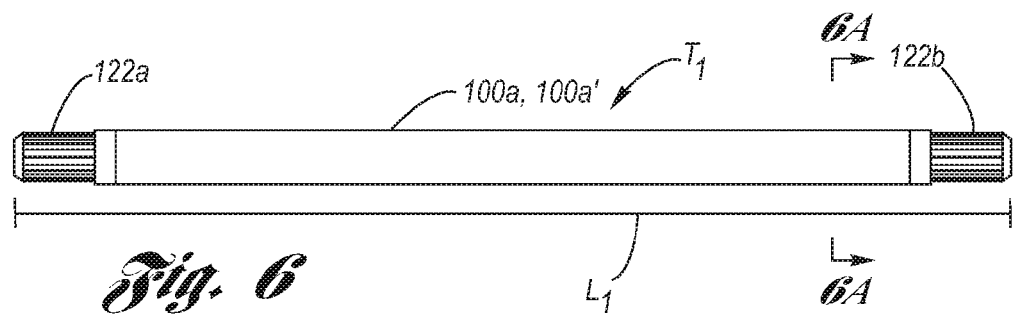
FIG. 6 is a side view of an example of a first asymmetric axle shaft according to the present invention.
Figure 6A:
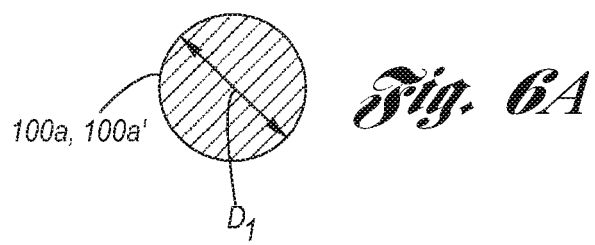
FIG. 6A is a cross-sectional view, seen along line 6A-6A of FIG. 6.

FIGS. 6 and 6A represent a first axle shaft 100*a*, 100*a'* in which a length $L_1$ is preselected and a cross-sectional diameter $D_1$ is also preselected. The selection criteria being that generally standard in the art regarding durability and torque load handling. In this regard, the first axle shaft has a selected torsional stiffness $T_1$. By way of example, the first axle shaft 100*a'* is constructed of solid or hollow steel in a cylindrical configuration, having splines 122*a*, 122*b* at each end for engaging constant velocity joints of the independent suspension.

In contradistinction, the second axle shaft 100*b* is asymmetric with respect to the first axle shaft 100*a* such that the physical properties thereof provide a different torsional stiffness $T_2$, which may be greater or less than $T_1$, wherein the ratio of the torsional stiffness is between about 1.4 to 1 and about 2.0 to 1. By way of example, the second axle shaft 100*b* is constructed of solid or hollow steel in a cylindrical configuration, also having splines 122*a*, 122*b* at each end for engaging constant velocity joints of the independent suspension.

Figure 7:
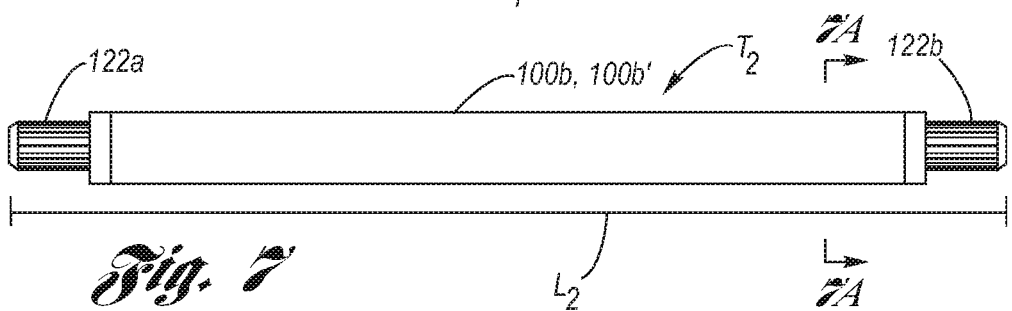
FIG. 7 is a first example of a second asymmetric axle shaft which is asymmetric with respect to FIG. 6.
Figure 8:
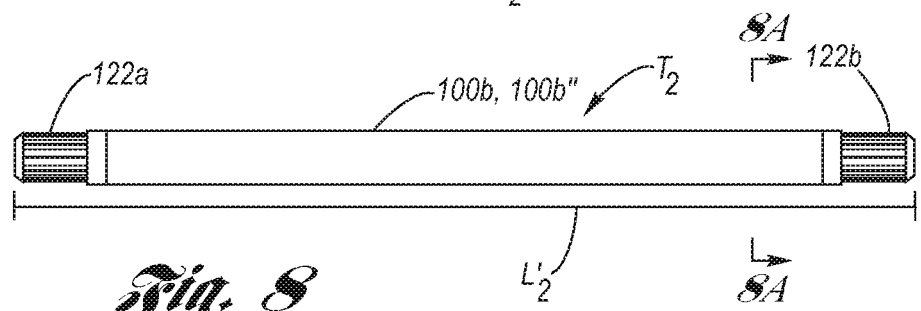
FIG. 8 is a second example of a second asymmetric axle shaft which is asymmetric with respect to FIG. 6.
Figures 8A, 8B:
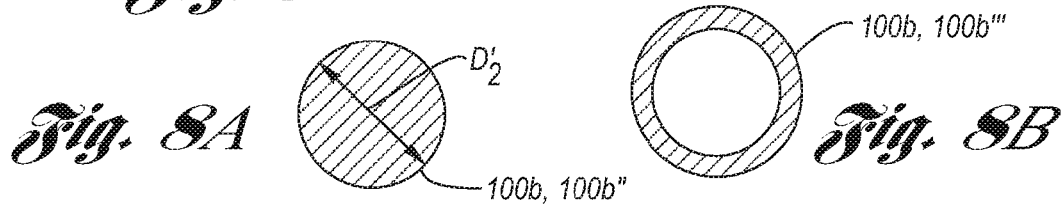
FIG. 8A is a cross-sectional view, seen along line 8A-8A of FIG. 8.
FIG. 8B is a cross-sectional view of a third example of a second asymmetric axle shaft which is asymmetric with respect to FIG. 6.

Turning attention next to FIGS. 7 through 8B, examples of how physical differences between the first and second axle shafts 100*a*, 100*b* may provide the desired difference in torsional stiffness.

Figure 7A:
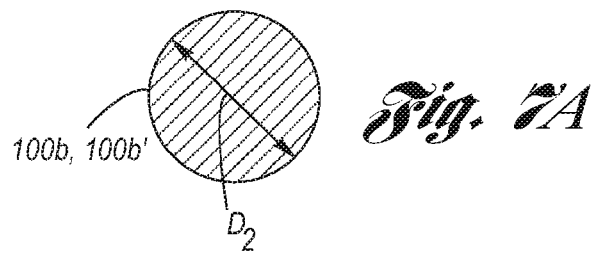
FIG. 7A is a cross-sectional view, seen along line 7A-7A of FIG. 7.

FIGS. 7 and 7A show a first example of a second axle shaft 100*b*, 100*b'* in which the length $L_2$ is equal to $L_1$; however, the cross-sectional diameter $D_2$ is different from $D_1$ (the splines 122*a*, 122*b* are identical to that of FIG. 3). In the example shown, $D_2 > D_1$, however, it is also equally possible, of course, to make $D_2 < D_1$, all that is required is that $D_1$ be different from $D_2$ such as to provide the desired difference in torsional stiffness in which the ratio is between about 1.4 to 1 and 2.0 to 1.

FIGS. 8 and 8A show a second example of a second axle shaft 100*b*, 100*b''* in which the cross-sectional diameter $D_2'$ is equal to $D_1$; however, length $L_2'$ is different from $L_1$, (the splines 122*a*, 122*b* are identical to that of FIG. 3). In the example shown, $L_2' < L_1$, however, it is also equally possible, of course, to make $L_2' > L_1$, all that is required is that $L_1$ be different from $L_2$ such as to provide the desired difference in torsional stiffness in which the ratio is between about 1.4 to 1 and 2.0 to 1.

Of course, it is possible to alter the physical properties in other ways to achieve the torsional stiffness difference as between the first and second axle shafts 100*a*, 100*b*, as for example by a selected combination of cross-sectional diameter difference, length difference, solidity difference (i.e., solid vs. hollow construction) or material composition difference (however, since various steels tend to have all about the same torsional stiffness for a given geometry steel materials substitution is unlikely to have, of itself, sufficient difference). An example of torsional stiffness asymmetry due to solidity difference is shown by comparison between FIGS. 6 and 8B, wherein a third example of a second axle shaft 100*b*, 100*b'''* is hollow, and may have a larger or smaller cross-sectional diameter than $D_1$ and a length longer or shorter than $L_1$, whereby the torsional stiffness is different therebetween. As mentioned, either or both of the first and second axle shafts 100*a*, 100*b* may be solid or hollow.

The asymmetric axle shafts 100, 100' are operably connected to a limited slip differential, which may be mechanical or electrical, (as for example 108 of FIG. 5 or 306 of FIG. 14) in order to provide an axle-to-axle mechanical coupling through which out of phase torque oscillation damping between the asymmetric axle shafts occurs. The mechanical coupling in a limited slip differential provides a friction torque coupling between the asymmetric axle shafts, wherein, as for example by empirical testing or mathematical modeling, an optimum friction torque is provided that is optimal for a given difference in torsional stiffness between the asymmetric axle shafts, per a particular application. In this regard, if there is no friction torque coupling between the asymmetric axle shafts, then the asymmetry of the axle shafts is unable to provide damping by out of phase torque oscillations axle-to-axle; on the other hand, if an open differential is used instead of a limited slip differential or if the coupling has no slip between the asymmetric axle shafts, then the torque oscillations therebetween will tend to be in phase, and damping will be mitigated, that is, lessened.

Figure 9:
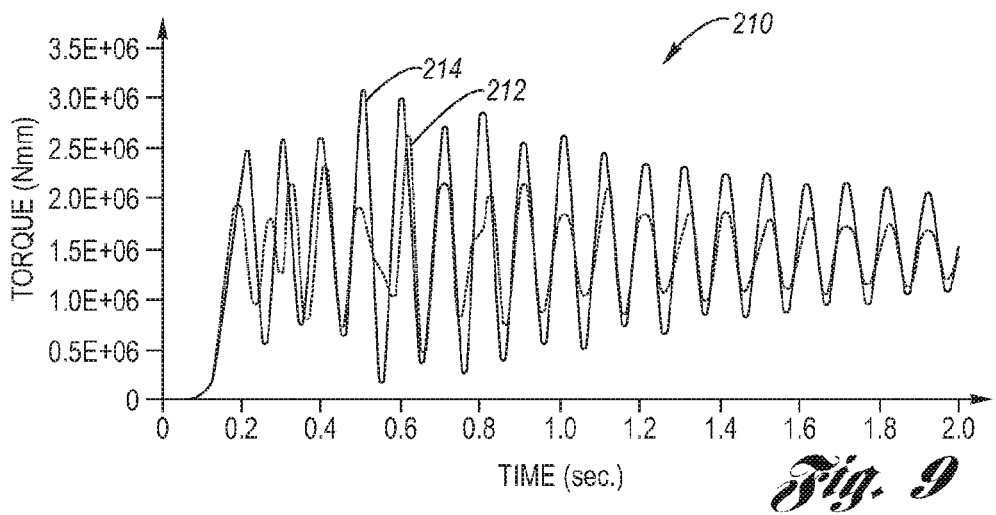
FIG. 9 is a graph of axle shaft torque versus time of an asymmetric axle shaft set according to the present invention.

FIG. 9 is a graph 210 of axle shaft torque versus time for asymmetric axle shafts 100 according to the present invention, wherein plot 212 is for the first axle shaft 100*a* which has a torsional stiffness of 270 Nm/deg. and wherein plot 214 is for the second axle shaft 100*b* which has a torsional stiffness of 525 Nm/deg. It will be seen that, unlike FIG. 1C, torque oscillations are out of phase, whereby the conditions for powerhop are mitigated in that the torque oscillations of each axle shaft are destructive with respect to each other (the out of phase torque oscillations being most pronounced during an initial portion of a powerhop event when powerhop is most likely to be felt by passengers of the vehicle).

Figure 10:
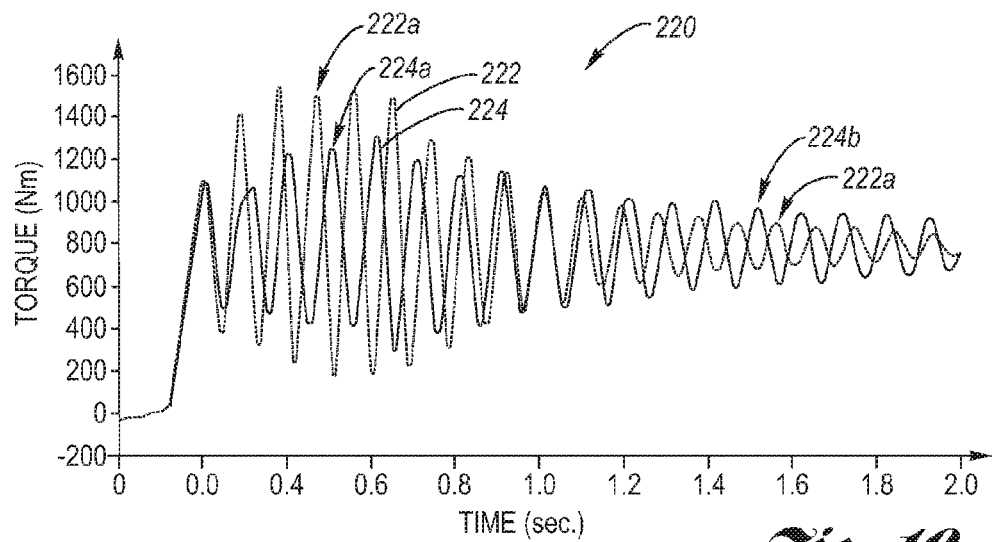
FIG. 10 is a graph of propeller shaft torque versus time comparing symmetric and asymmetric axle shaft sets.

FIG. 10 is a graph 220 of propeller shaft (see 116 of FIG. 5) torque versus time for conventional symmetric axle shafts at plot 222, wherein each axle shaft has a torsional stiffness of 525 Nm/deg., wherein the propeller shaft has a torsional stiffness of 138 Nm/deg. and wherein cradle mount (see 106 of FIG. 2) damping is 2 Nsec/mm; and for asymmetric axle shafts 100 according to the present invention at plot 224, wherein the first axle shaft 100*a* has a torsional stiffness of 270 Nm/deg. and the second axle shaft 100*b* which has a torsional stiffness of 525 Nm/deg., wherein the propeller shaft has a torsional stiffness of 138 Nm/deg. and wherein cradle mount damping is 2 Nsec/mm with an electronic limited slip differential having a friction torque of 400 Nm. It will be seen that the amplitudes of the torque oscillations in initial plot portion 222*a* are high, which is interpreted to mean powerhop is of sufficient amplitude that it may be felt by passengers. On the other hand, initial plot portion 224*a* has lower amplitude torque oscillations than initial plot portion 222a, which is interpreted to mean powerhop is not of sufficient amplitude that it may be felt by passengers. The fact that following plot portion 224b of plot 224 has a residual amplitude larger than that of following plot portion 222b of plot 222 is of vanishing consequence, since the amplitudes of these torque oscillations will not be felt by passengers of the vehicle.

Figure 11:
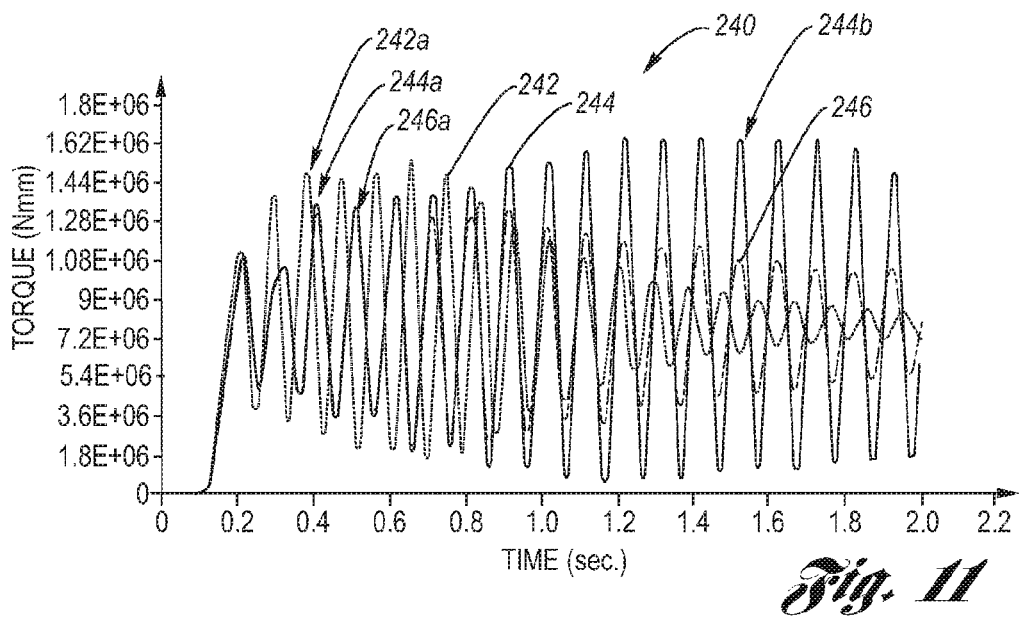
FIG. 11 is a graph of propeller shaft torque versus time comparing a symmetric axle shaft set with highly damped cradle mounts, an asymmetric axle shaft set with minimally damped cradle mounts, and an asymmetric axle shaft set with highly damped cradle mounts.

FIG. 11 is a graph 240 of propeller shaft torque versus time for conventional symmetric axle shafts at plot 242, wherein each axle shaft has a torsional stiffness of 525 Nm/deg., wherein the propeller shaft has a torsional stiffness of 138 Nm/deg. and wherein cradle mount damping is high at about 2 Nsec/mm.; for asymmetric axle shafts 100 according to the present invention at plot 244, wherein the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is minimal around 0.2 Nsec/mm at around 10 Hz; and for asymmetric axle shafts 100 according to the present invention at plot 246, wherein the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is high at about 2 Nsec/mm. It will be seen that the amplitudes of the torque oscillations in plot portion 242a of plot 242 are high, which is interpreted to mean powerhop is of sufficient amplitude that it may be felt by passengers, while that of initial plot portion 244a of plot 244 and initial plot portion 246a of plot 246 have amplitudes of the respective torque oscillations are low enough that passengers would not feel powerhop. What is seen further, however, is that while initial plot portion 244a has relatively low torque oscillation amplitude, that for following plot portion 244b, the torque oscillation amplitude increases to a level which may be felt by passengers. On the other hand, plot 246 everywhere has low torque oscillation amplitudes, which is interpreted to mean that powerhop would not be felt by passengers. Accordingly, depending upon the application, it may be desirable to include high damped cradle mounts with the asymmetric axle shafts 100; however, it is to be noted that there are applications that will not utilize cradle mounts, yet the asymmetric axle shafts damping will still be provided.

Figure 12:
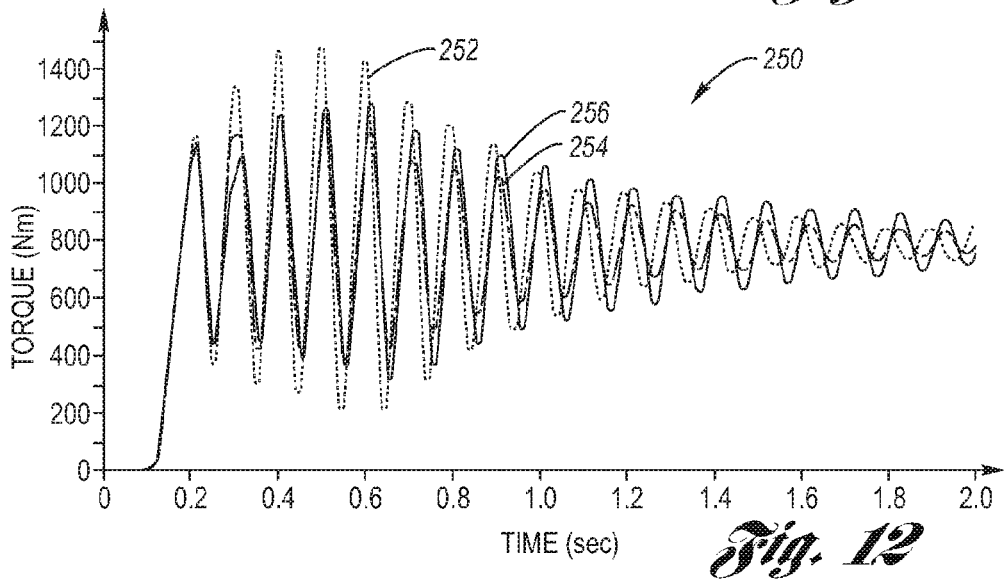
FIG. 12 is a graph of torque versus time of an asymmetric axle shaft set for various values of limited slip differential friction torque.

An illustration of the effect of limited slip differential friction torque is shown at FIG. 12, which is a graph 250 of axle shaft torque versus time for asymmetric axle shafts 100 according to the present invention. In this illustration, the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is 2 Nsec/mm. It will be seen that a friction torque of 100 Nm, per plot 252, may be too low, a friction torque of 400 Nm may be optimum, per plot 254, and a friction torque of 2,000 Nm, per plot 256, may be too high.

Figures 13A, 13B:
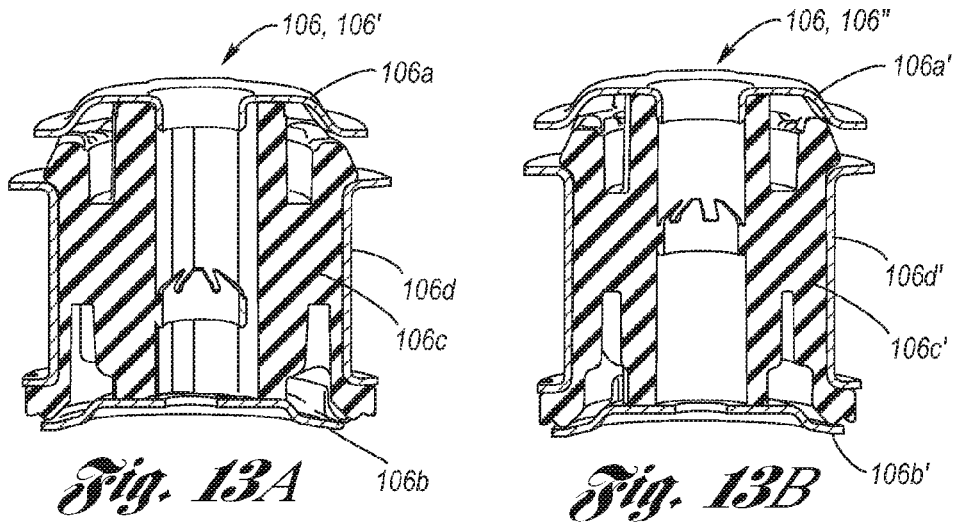
FIG. 13A is a cross-sectional view of a rear cradle mount.
FIG. 13B is a cross-sectional view of a front cradle mount.

In the event resilient cradle mounts 106 are used, the stiffness of the cradle mounts is adjusted by the configuration and choice of rubber. By way of exemplification, resilient cradle mounts are depicted at FIGS. 13A and 13B, wherein FIG. 13A depicts a rear cradle mount 106', and FIG. 13B depicts a front cradle mount 106". Each cradle mount 106', 106" is composed, respectively, of an upper metal washer 106a, 106a', a lower metal washer 106b, 106b', a rubber core 106c, 106c' and an outer sleeve 106d, 106d'.

Figure 14:
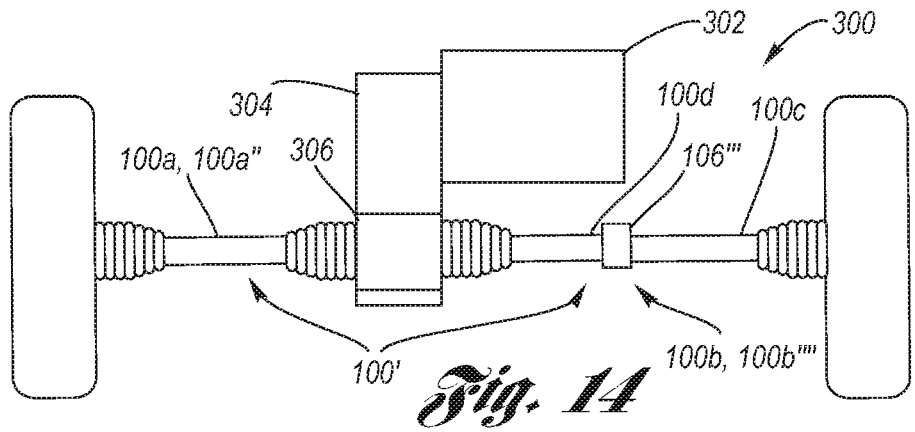
FIG. 14 is a schematic view of a front wheel drive system with one of the asymmetric axle shafts including a jackshaft.

FIG. 14 is a schematic depiction of a front wheel drive system 300, including an engine 302, a transmission 304, a limited slip differential 306 and asymmetric axle shafts 100'.

The first axle shaft 100a, 100a" is, for example, as depicted at FIG. 6. The second axle shaft 100b, 100b"" is a combination of a second axle shaft component 100c and a jackshaft component 100d drivingly connected thereto, by way of example at a cradle mount 106'". It will be understood that the asymmetry as between the first and second axle shafts includes the physical properties (i.e., length, cross-sectional diameter, solidity, composition, etc.) of the first axle shaft 100a, 100a" with respect to the second axle shaft 100b, 100b"" per each or both of the second axle shaft component 100c and the jackshaft component 100d.

By way of exemplification and not limitation, the following example is given merely for referential purposes.

EXAMPLE

Asymmetric axle shafts have the first axle shaft 100a with a torsional stiffness of 270 Nm/deg. (right hand axle shaft having a diameter of 35 mm between the splines, a length of 0.6 meters, and composed of solid 300M type steel) and have the second axle shaft 100b with a torsional stiffness of 525 Nm/deg. (left hand axle shaft having a diameter of 55 mm between the splines, a length of 0.52 meters composed of hollow 300M type steel with an 8 mm wall thickness); the propeller shaft has a torsional stiffness of 138 Nm/deg.; the friction torque of the limited slip differential is 400 Nm; and the cradle mounts have a vertical damping of 2 Nsec/mm.

Figure 15:
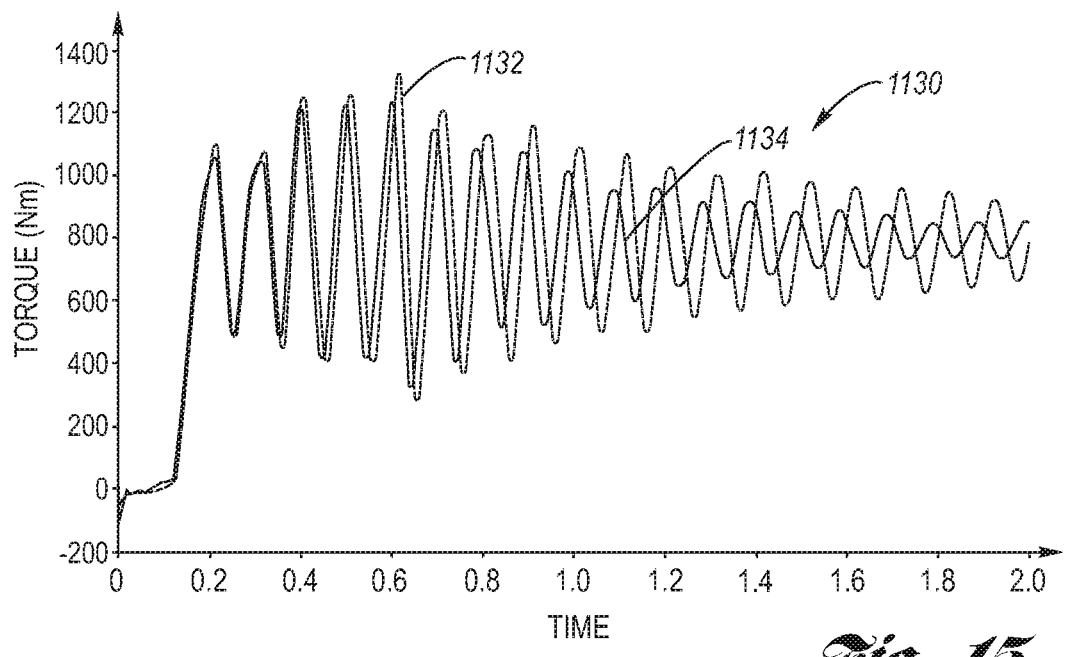
FIG. 15 is a graph of propeller shaft torque versus time for independently suspended asymmetric axle shafts, and independently suspended asymmetric axle shafts with rearward torque arm according to the present invention.
Figure 16:
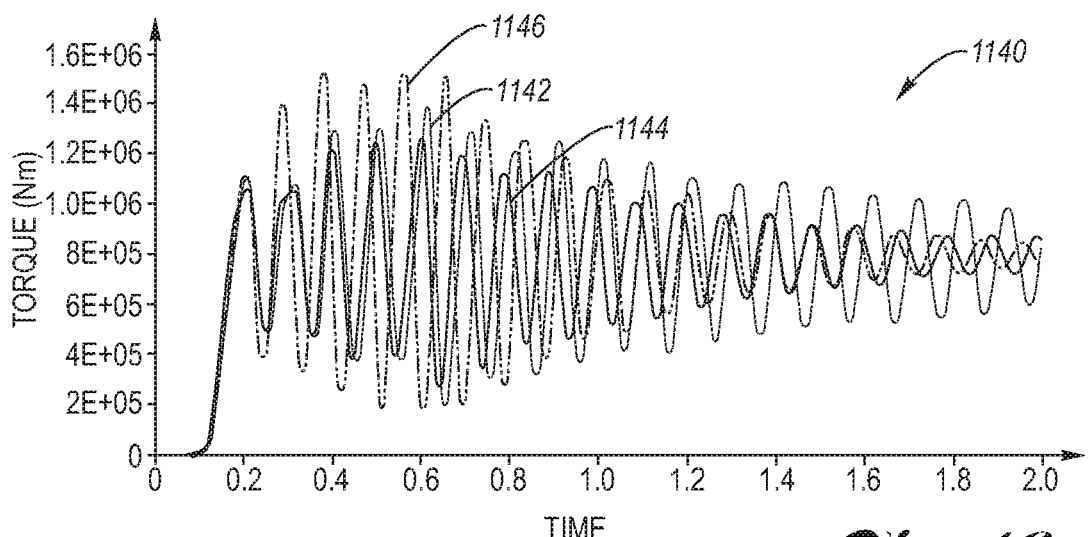
FIG. 16 is a graph of propeller shaft torque versus time for independently suspended symmetric axle shafts, independently suspended asymmetric axle shafts, and independently suspended asymmetric axle shafts with rearward torque arm according to the present invention.

Turning now to FIGS. 15 and 16, depicted are beneficial aspects of the rearward torque arm according to the present invention when used in combination with the above described asymmetric axle shafts.

FIG. 15 is a graph 1130 of axle shaft torque versus time for asymmetric axle shafts 100 with and without the rearward torque arm 1006 according to the present invention. In this example, the first axle shaft 100a has a torsional stiffness of 270 Nm/deg. and the second axle shaft 100b which has a torsional stiffness of 525 Nm/deg., wherein the propeller shaft has a torsional stiffness of 138 Nm/deg. and wherein cradle mount damping is 2 Nsec/mm. Plot 1132 is for the asymmetric axle shafts without a rearward torque arm, and Plot 1134 is for the asymmetric axle shafts with the rearward torque arm according to the present invention. It will be seen that Plot 1134 has a superior damping of torque oscillations as compared with Plot 1132.

FIG. 16 is a graph 1140 as in FIG. 15, wherein now the asymmetric axle shafts of FIG. 15, without a rearward torque arm, Plot 1142, and with the rearward torque arm according to the present invention, Plot 1144, are compared with symmetric axle shafts, each of a torsional stiffness of 525 Nm/deg. without a rearward torque arm, Plot 1446. It will be seen that Plot 1144 has a superior damping of torque oscillations as compared with Plot 1142, wherein Plot 1142 is clearly superior in torque oscillation damping over Plot 1146 of a conventional symmetric axle set.

While it is the case that either of the asymmetric axle shafts or the rearward torque arm may be used alone, the synergistic effect of using them simultaneously has definite benefit to mitigate powerhop. The table below indicates how the present invention can mitigate powerhop for various road conditions, wherein a series of tests were performed, the powerhop feel being subjectively judged for a dry road and for a wet road:

TABLE

| Axle Shaft Type | Rearward Torque Arm | Dry Road | Wet Road |
|---|---|---|---|
| Symmetric | No | Noticeable | Noticeable |
| Asymmetric | No | Eliminated | Noticeable |
| Symmetric | Yes | Noticeable | Eliminated |
| Asymmetric | Yes | Eliminated | Eliminated |

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A motor vehicle and drive system thereof, comprising:
a body having a body front end and an oppositely disposed body rear end;
a first axle shaft;
a second axle shaft, wherein said first and second axle shafts are independently suspended with respect to said body;
a differential drivingly connected to said first and second axle shafts; and
a rigid torque arm having a torque arm forward end and an oppositely disposed torque arm rearward end, said torque arm forward end being rigidly connected to said differential and said torque arm rearward end being pivotally connected to said body at a location closer to said body rear end than is said differential, wherein the torque arm rearward end is retained at a fixed spatial distance from the body at the connection;
wherein said torque arm positively couples vibrations as between said first and second axle shafts by a non-linear coupling of vertical and torsional motions directly to the body so as to thereby decay powerhop oscillations of the first and second axle shafts.

2. The motor vehicle and drive system of claim 1, wherein said torque arm rearward end is connected to said body by connection to a clevis, wherein said clevis is connected to said body.

3. The motor vehicle and drive system of claim 1, wherein:
said differential is a limited slip differential;
said first axle shaft has a first torsional stiffness; and
said second axle shaft has a second torsional stiffness;
wherein a torsional stiffness difference between the first torsional stiffness and the second torsional stiffness is defined by a ratio between said first torsional stiffness and said second torsional stiffness, and wherein said ratio is greater than substantially about 1.4 to 1;
wherein said limited slip differential provides a predetermined friction torque with respect to said first and second axle shafts; and
wherein the first and second axle shafts are operably connected to the limited slip differential in order to provide an axle-to-axle mechanical coupling through which out of phase torque oscillation damping between the first and second axle shafts occurs, the mechanical coupling in the limited slip differential providing a friction torque coupling between the first and second axle shafts.

4. The motor vehicle and drive system of claim 3, wherein said friction torque is greater than about 100 Nm and less than about 2,000 Nm.

5. The motor vehicle and drive system of claim 4, wherein said torque arm rearward end is connected to said body by connection to a clevis, wherein said clevis is connected to said body, and wherein the connection of the torque arm rearward end to said clevis is pivotal.

6. The motor vehicle and drive system of claim 3, wherein said first axle shaft has a first set of physical properties and said second axle shaft has a second set of physical properties, wherein a difference between said physical properties provides said torsional stiffness difference.

7. The motor vehicle and drive system of claim 6, wherein said ratio is substantially between about 1.4 to 1 and about 2.0 to 1.

8. The motor vehicle and drive system of claim 7, wherein said difference between said physical properties is a relative difference in at least one of cross-sectional diameter, length, solidity and composition between said first and second axle shafts, respectively.

9. The motor vehicle and drive system of claim 8, wherein said friction torque is greater than about 100 Nm and less than about 2,000 Nm.

10. The motor vehicle and drive system of claim 9, wherein said torque arm rearward end is connected to said body by connection to a clevis, wherein said clevis is connected to said body, and wherein the connection of the torque arm rearward to said clevis is pivotal.

11. The motor vehicle and drive system of claim 3, wherein said second axle shaft comprises:
a second axle shaft component; and
a jackshaft component drivingly connected to said second axle shaft component;
wherein said difference is provided by selected physical properties of said second axle shaft component and said jackshaft component.

12. The motor vehicle and drive system of claim 11, wherein said ratio is substantially between about 1.4 to 1 and about 2.0 to 1.

13. The motor vehicle and drive system of claim 12, wherein said difference between said physical properties is a relative difference in at least one of cross-sectional diameter, length, solidity and composition between said first and second axle shafts, respectively.

14. The motor vehicle and drive system of claim 13, wherein said friction torque is greater than about 100 Nm and less than about 2,000 Nm.

15. The motor vehicle and drive system of claim 14, wherein said torque arm rearward end is connected to said body by connection to a clevis, wherein said clevis is connected to said body, and wherein the connection of the torque arm rearward to said clevis is pivotal.

16. A method of mitigating powerhop in an independently suspended driven axle shaft set of a motor vehicle, comprising the steps of:
providing a body of the motor vehicle;
providing first and second axle shafts independently suspended with respect to the body;
providing a differential drivingly connected to the first and second axle shafts;
providing a rigid rearward torque arm;
connecting the rearward torque arm rigidly to the differential; and
pivotally connecting, in a rearward body direction from the differential, the rearward torque arm to the body at fixed spacing from the body;
wherein the rearward torque arm is selected so that torque oscillations as a function of time are generally out of phase with respect to the first and second axle shafts; and
wherein the rearward torque arm positively couples vibrations as between said first and second axle shafts by a non-linear coupling of vertical and torsional motions directly to the body so as to thereby decay powerhop oscillations of the first and second axle shafts.

17. The method of claim 16, wherein said step of providing said first and second axles shafts further comprises:
selecting a torsional stiffness difference between a first torsional stiffness of the first axle shaft;
selecting a second torsional stiffness of the second axle shaft; and
axle-to-axle friction torque coupling the first and second axle shafts such that the first and second axle shafts are mutually coupled by a selected friction torque through the coupling;
wherein the torsional stiffness difference is defined by a ratio between said first torsional stiffness and said second torsional stiffness, and wherein the ratio is greater than substantially about 1.4 to 1.

18. The method of claim 17, wherein said step of providing a differential comprises:
providing a limited slip differential; and
providing the limited slip differential with the selected friction torque;
wherein the rearward torque arm and the torsional stiffness difference are selected so that torque oscillations as a function of time are generally out of phase with respect to the first and second axle shafts responsive to the ratio and the selected friction torque.

19. The method of claim 18, wherein said step of selecting selects the ratio as being substantially between about 1.4 to 1 and about 2.0 to 1.

* * * * *